United States Patent [19]

Kane

[11] Patent Number: 4,947,402

[45] Date of Patent: Aug. 7, 1990

[54] TWO-MIRROR SHAPING OF A NON-CIRCULAR OPTICAL PUMPING BEAM AND LASERS USING SAME

[75] Inventor: Thomas J. Kane, Palo Alto, Calif.

[73] Assignee: Lightwave Electronics Corporation, Mountain View, Calif.

[21] Appl. No.: 185,466

[22] Filed: Apr. 25, 1988

[51] Int. Cl.⁵ ............................................. H01S 3/091
[52] U.S. Cl. ..................................... 372/70; 372/69; 372/71; 372/75; 372/101; 350/619
[58] Field of Search .............................. 372/43, 69–71, 372/75, 92, 93, 99, 101, 33; 350/602, 617–620, 624, 628, 629

[56] References Cited

U.S. PATENT DOCUMENTS

| | | | |
|---|---|---|---|
| 2,869,423 | 1/1959 | Hoge et al. | 350/619 |
| 3,732,505 | 5/1973 | Freedman | 372/75 |
| 3,957,339 | 5/1976 | Engel | 350/619 |
| 4,185,891 | 1/1980 | Kaestner | 372/101 |
| 4,739,507 | 4/1988 | Byer et al. | 372/71 |

Primary Examiner—William L. Sikes
Assistant Examiner—Georgia Y. Epps
Attorney, Agent, or Firm—Rosenblum, Parish & Bacigalupi

[57] ABSTRACT

In a laser, the laser gain member is optically pumped by a semiconductive source of pumping radiation having an elongated output beam aperture such as that provided by a single-wide stripe diode or diode array. The elongated beam of optical pumping radiation is twice reflected from a concave surface at non-normal angles of incidence and then focused onto the laser gain material for pumping same. The reflections serve to differentially focus rays diverging in the vertical plane from rays diverging in the horizontal plane to shape the pumping beam for improved pumping efficiency in the pumped mode volume of the laser gain material. In a preferred embodiment, a magnifying lens is disposed inbetween the source and the reflectors for decreasing the divergence of the pumping beam.

14 Claims, 2 Drawing Sheets

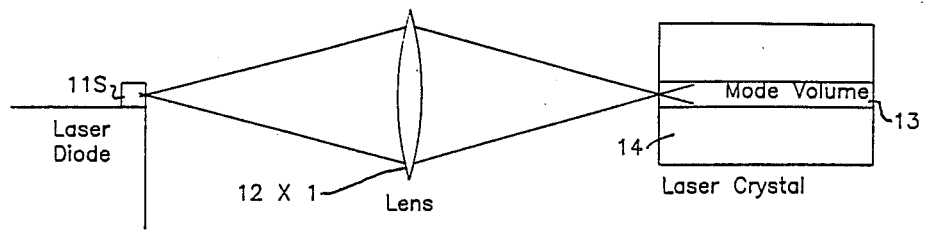
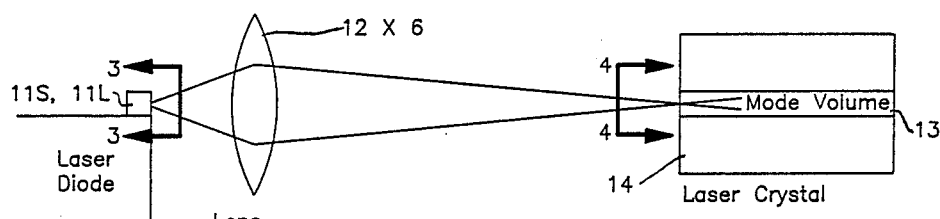
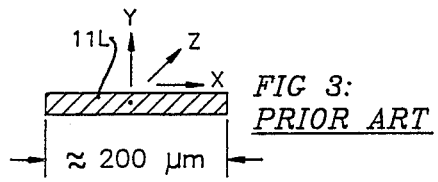
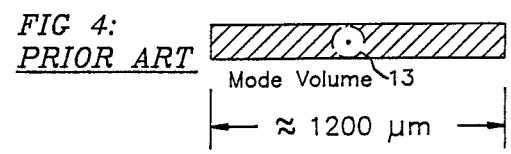
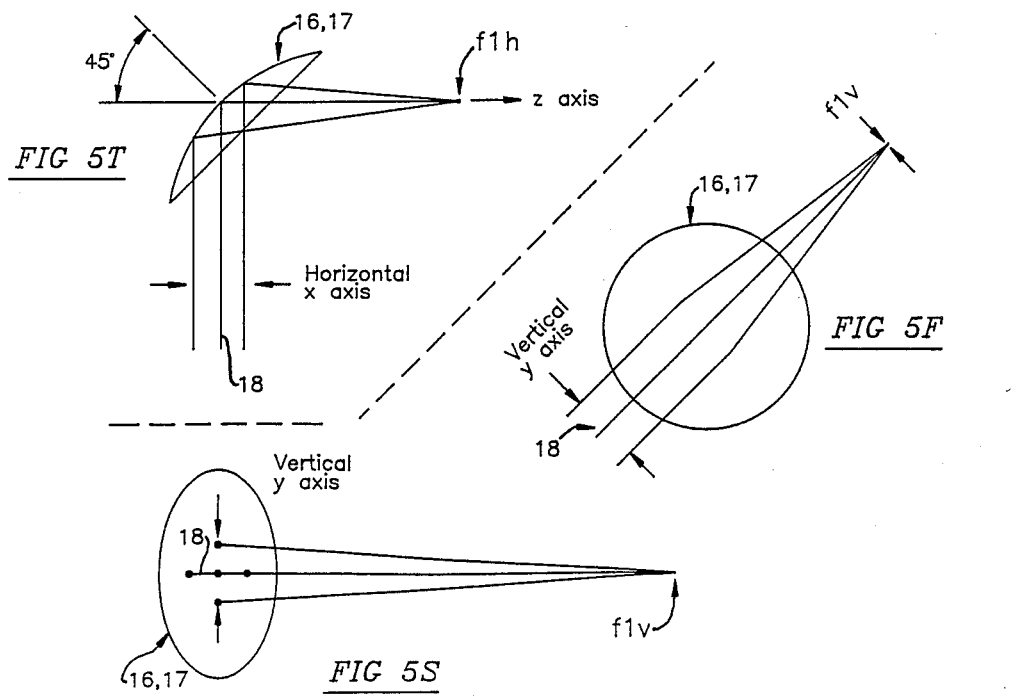

TWO-MIRROR SHAPING OF A NON-CIRCULAR OPTICAL PUMPING BEAM AND LASERS USING SAME

This invention was made with government support under contract No. NAS7-999 awarded by Jet Propulsion Laboratory. The government has certain rights in this invention.

BACKGROUND OF THE INVENTION

1. Field of the Invention

The present invention relates in general to a two-mirror system for reshaping non-circular beams of optical pumping radiation so as to provide smaller diameter absorption volumes in an optically pumped laser gain medium.

2. DESCRIPTION OF THE PRIOR ART

In a diode-end-pumped laser, light from a laser diode or laser diode array is absorbed by the active atoms of a solid state laser gain material. In order to maximize the gain and minimize the size of the diode-pumped laser, it is desirable to minimize the volume in which the absorption of the diode light takes place.

To minimize the absorption volume, it is necessary to minimize the average cross-sectional area of the laser diode beam over the distance within which absorption takes place in the laser gain material. The pump beam should come to a focus at the entrance to the solid-state laser gain material and remain as small as possible throughout the absorption length.

Single-narrow stripe laser diodes, such as those commercially available from Toshiba, emit light from a very small aperture. Because the aperture height is small, the vertical divergence of the light leaving the aperture is large. For diode pumping of Nd:YAG, or of any other solid-state laser gain material with absorption lengths exceeding a few hundred microns, the pump beam divergence is so large that it requires some re-shaping for use of the beam. In a typical example of a solid state laser gain medium pumped by a single-narrow stripe laser diode, it is desired to absorb the light in a volume of length one millimeter and diameter 0.08 millimeters. The diode pumping beam has a 30 degree vertical divergence and diverges after one mm to a 0.5 mm diameter. It is conventional to use a SELFOC (refractive index) lens to magnify by a factor of six the beam emitted from the diode. This magnification decreases the divergence of the beam by a factor of six, so that after propagating one mm in the laser gain material, the beam only diverges to about 0.08 mm in diameter. Such a single-narrow stripe diode in the horizontal direction has an emitting width of five microns and a divergence angle of 10 degrees. Thus, after magnification by six, its horizontal divergence is very small. The size of the focus spot is six times five microns or 0.03 mm, still well within the goal of 0.08 mm.

Referring now to FIG. 1, there is shown a prior art short stripe laser diode 11S pumped laser employing a focusing lens 12×1 with a magnification of one. More particularly, optical pumping radiation emanating from the output aperture of laser diode 11 is gathered by spherical lens 12×1 and focused into the mode volume 13 of a laser gain material such as Nd:YAG 14. In this case, laser diode 11S is a single-narrow-stripe laser diode which has a beam output aperture resembling a point source. This point source is imaged on the input face of the laser crystal 14. The laser pumping radiation is widely divergent from the output aperture of the laser diode 11S and, therefore, as focused with a magnification of only one, it rapidly diverges and is not confined to the desired mode volume 13 such as a cylindrical absorption region 100 microns in diameter and 1,000 microns in length. As a result, pumping radiation is not properly matched to the desired mode volume 13, and inefficient and nonoptimum pumping of the laser crystal 14 results.

Referring now to FIG. 2, there is shown an improved version of the prior art of FIG. 1 wherein the magnifying lens 12×6 magnification is increased to a factor of, for example, six, which serves to reduce the divergence of a focused image in the mode volume 13 correspondingly by a factor of six. As a result, essentially all of the optical pumping radiation is absorbed in mode volume 13 of the laser crystal 14 and optimum beam-pumping conditions are obtained when pumping with a single-narrow stripe diode 11S.

While single-narrow stripe laser diode 11S beams typically require no special shaping for pumping small absorption volumes 13, they have the disadvantage that they are limited in the amount of pumping beam output power. On the other hand, wide-stripe diodes and diode arrays provide substantially greater optical beam pumping power but they have emitting areas which are relatively large in the horizontal dimension. For example, wide-stripe diodes such as those commercially available from Sony, or laser diode arrays such as those commercially available from Spectra Diode Laboratories, have emitting aperture widths of up to 200 microns. The horizontal width at the aperture of the pumping diode already exceeds the desired width of the absorption volume 13 in the laser gain material.

Referring now to FIGS. 3 and 4, there is seen the problem that arises when the single-narrow-stripe laser diode 11S is replaced by a single-wide stripe or laser diode array 11L. In this example, the output aperture of the laser diode pump as shown in FIG. 3 is characterized as a non-circular or elongated aperture beam having a short height and a less narrow width of approximately 200 micrometers. When this source 11L is magnified by a magnifying lens 12×6, the horizontal width of the source 11L is imaged on the mode volume 13 greatly exceeds the width of the mode volume, i.e., as a width of approximately 1,200 micrometers as shown in FIG. 4 while the desired mode volume width is only 100 micrometers. As a result the pumped mode volume is not well matched to the desired mode volume 13, resulting in non-optimum pumping conditions and a substantial loss of efficiency. Because of the large width of these higher power diode arrays and the wide-stripe diodes 11L, it is not desirable to magnify their horizontal widths. The aperture heights and the angles of divergence for such higher power diodes 11L are about the same as for a single-narrow stripe laser diode. The larger vertical divergence angle means that it is still desirable to magnify the beam in the vertical direction. Thus, for a wide-stripe type diode, or a laser diode array, it is desired to magnify the vertical dimension by a factor of three to ten while leaving the horizontal dimension nearly unchanged or in fact demagnified.

Thus, it is desired to build an imaging system for shaping of the non-circular optical pumping beam from a wide-stripe diode or a diode array 11L which has no magnification in the horizontal direction while having magnification by a factor of three or more in the vertical direction.

Diode lasers also have a problem of astigmatism. This is equivalent to light diverging in the vertical plane being emitted from a different point than light diverging in the horizontal plane. If a diode beam is astigmatic, then it is not possible to focus its light to a point using only a spherical lens. The light will come to a line focus at one distance, and another line focus rotated by 90 degrees at another distance. A single tight focus is much preferred. Therefore, it is desired to obtain an optical beam-shaping or imaging system to eliminate the effects of astigmatism by independently positioning the foci in the horizontal and vertical directions. In this manner, it will be possible to force an overlap of the horizontal and vertical image depths of focus.

Two techniques for laser diode beam-shaping have been proposed. One conventional technique uses prisms and the other uses cylindrical lenses. Both of these techniques take advantage of the fact that prisms or cylindrical lenses differently affect light rays diverging in one plane as compared to light rays diverging in the orthogonal plane.

Both techniques have the disadvantage that the optical components and the distances needed to allow the components to have their desired effect, are large. In diode-pumping, it is desired to minimize size. In addition, cylindrical lenses are fairly expensive. In the prism techniques, additional lenses are needed both before and after the prisms.

SUMMARY OF THE PRESENT INVENTION

A principal object of the present invention is the provision of an improved method for shaping a non-circular optical pumping beam.

In one feature of the present invention, optical pumping radiation emanating from an elongated source is imaged and focused into a laser gain medium by twice reflecting the non-circular beam off a concave reflecting surface at non-normal incidence to differentially focus rays of the beam in orthogonal planes to an image of the source in the laser gain material, whereby the source image elongation in the laser gain material is reduced for improved optical pumping of the laser gain medium.

In another feature of the present invention, rays emanating from the source and diverging in the (vertical) plane normal to the axis of elongation of the source image are focused by the first reflection to a focal point beyond the point of the second reflection, and rays emanating from the source and diverging in the horizontal plane parallel to the axis of elongation of the source image are focused by the first reflection to a focal point in front of the point of the second reflection.

In another feature of the present invention, the second reflection focuses rays diverging in the plane normal to the axis of elongation and rays diverging in the horizontal plane to an image of the source in the laser gain medium.

In another feature of the present invention, rays of optical pumping radiation emanating from the source are gathered in a lens to create a magnified image of the source which is thence shaped and re-imaged by the first and second reflections into the laser gain medium.

In another feature of the present invention, the first and second reflections are performed on first and second substantially identical spherical mirrors, and the angles of incidence for both mirrors are substantially 45 degrees.

Other features and advantages of the present invention will become apparent upon a perusal of the following specification taken in connection with the accompanying drawing wherein:

BRIEF DESCRIPTION OF THE DRAWING

FIG. 1 is a longitudinal sectional view of a partly schematic diagram of a prior art laser pumped by a single-narrow stripe laser diode;

FIG. 2 is a view similar to that of FIG. 1 depicting an alternative prior art embodiment employing magnification to reduce the pumped mode volume;

FIG. 3 is a sectional view of a prior art structure as in FIG. 2 taken along line 3—3 in the direction of the arrows and depicting the elongated source of optical pumping radiation characterized by a wide single-stripe laser diode or a laser diode array;

FIG. 4 is a sectional view of a prior art structure as in FIG. 2 taken along line 4—4 in the direction of the arrows depicting the undesired mode volume mismatch to the magnified image of a wide stripe or diode array as focused onto the desired circular mode volume of a laser crystal;

FIGS. 5T, 5S and 5F are top, side and front schematic diagrams depicting a spherical mirror's differential horizontal and vertical focusing effects for rays at a 45 degree angle of horizontal incidence;

DESCRIPTION OF THE PREFERRED EMBODIMENTS

Figure 8:
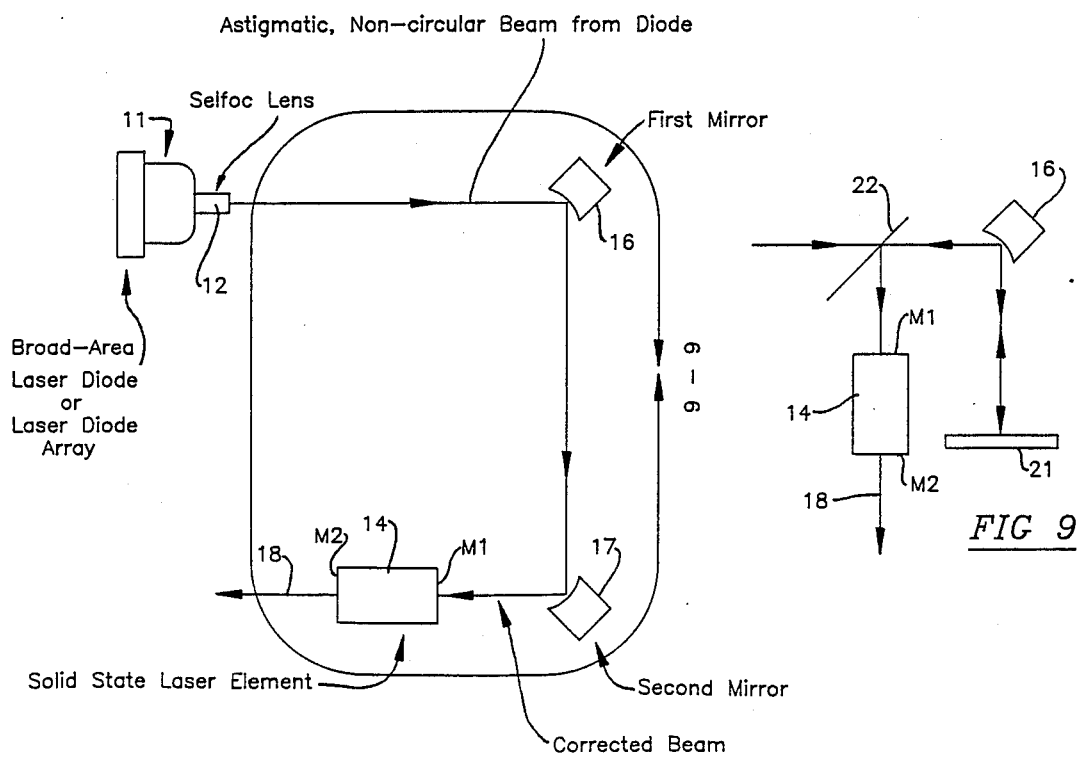
FIG. 8 is a schematic line diagram, partly in block diagram form, of an optically pumped laser incorporating features of the present invention.

Referring now to FIG. 8, there is shown a laser incorporating optical pumping features of the present invention. More particularly, optical pumping radiation emanating from the output beam aperture of a laser diode 11L, such as a wide stripe laser diode or a laser diode array, is gathered and magnified by preferably a SELFOC ® lens 12. The output beam aperture image is magnified onto a first concave mirror 16 at non-normal incidence which reflects the pumping radiation onto a second concave mirror 17 at non-normal incidence. The light beam reflected from second mirror 17 is focused into a mode volume 13 of a laser gain material 14, which produces a laser output beam along axis 18.

The laser gain medium 14 is contained within an optical resonator not shown in detail, but typically formed by spherical mirrors M1 and M2 located at opposite ends of a laser gain element such as a rod. Alternatively, the laser resonator may comprise gain medium in a non-planar ring of the type disclosed in U.S. Pat. No. 4,578,793, issued 24 March 1986, which is hereby incorporated by reference in its entirety, and also as disclosed in "Optics Letters" Vol. 12 No. 3 pp. 175-177 (March 1987).

Referring again to FIG. 3, there is shown the noncircular beam aperture of the wide-stripe or laser-diode array source 11L of optical pumping radiation. The beam of optical pumping radiation emanating from the output aperture of the source is elongated, for example 200 microns, in the x direction and is short or narrow in the vertical or y direction. The central axis ray of the optical pumping radiation represents the z direction. Thus, the horizontal plane as defined herein is the plane containing the axis of elongation x and the central ray z. The vertical plane as defined herein is the plane containing the short height direction y and the central axis ray z.

Referring now to FIGS. 5S, 5T and 5F, there are shown the focusing effect of a spherical mirror 16 or 17 of radius R and focal length R/2 on a beam of pumping radiation along axis 18 incident on the mirror at 45 degree to its axis of revolution. The mirror 16 or 17 focuses light differentially in the two orthogonal planes. More specifically, rays in the horizontal plane containing both the incident and the reflected central rays (the tangential plane), FIG. 5(T), will be focused with a focal length reduced by the square root of 2 and thus equal to R/2(sq.rt.2), whereas rays in the orthogonal sagittal plane FIG. 5(S), are focused with a focal length increased by the square root of 2 to R/sq.rt.2. Thus, one set of rays is focused twice as much as the other set of rays. This effect enables treating divergences in the two orthogonal planes differently for focusing the horizontal and vertical plane rays emanating from the elongated output beam aperture of a laser diode 11L.

Figure 6:
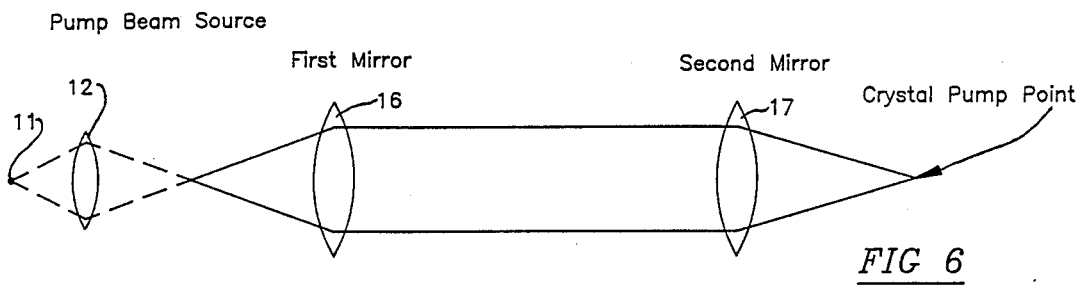
FIG. 6 is the lens analogy for the vertically divergent ray focusing effect of the two-mirror structure of FIG. 8.
Figure 7:
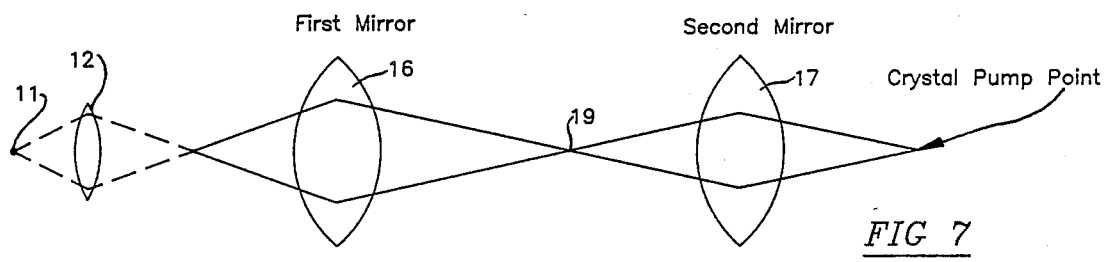
FIG. 7 is the lens analogy for the horizontal plane focusing for the two-mirror structure of FIG. 8.

The FIG. 8 two-mirror focusing effects in the vertical add horizontal planes, respectively are shown, for the sake of clarity, in the lens analog of FIGS. 6 and 7 because of the difficulty in drawing rays for a reflective mirror system. In the vertical plane, the rays are weakly focused by the first and second lens 16 and 17, as this is the sagittal plane of mirrors 16 and 17. The beam does not focus before reaching the second mirror 17. The second mirror brings the vertical rays to a final focus at the pump beam input point M1 at the crystal gain material 14.

In the horizontal plane, FIG. 7, the rays are strongly focused. The beam crosses through a first horizontal focus f1h or 19 between the two mirrors 16 and 17. The beam is then inverted and diverges, and by second mirror 17 is again strongly focused to a second focal point at the pump input point at input face M1 of the mode volume of the laser gain material 14. The magnification in the FIG. 6 vertical dimension substantially exceeds the magnification in the FIG. 7 horizontal dimension. Thus, a two-mirror focusing scheme as in FIG. 8 is especially well-suited for shaping and imaging non-circular or elongated sources of optical pumping radiation, as shown in FIG. 3, onto the input face M1 of a mode volume 13.

The SELFOC lens 12 adds additional magnification and the magnification of the entire system, including the SELFOC lens and the two mirrors 16 and 17, is the product of the magnifications of the SELFOC lens 12 and of the two mirrors 16 and 17. In this way, the mirror pair 16 and 17 magnification is multiplied by the magnification of the lens 12, giving a greater possible range of net magnification values. Magnification of the lens 12 is preferably greater than one to reduce the numerical aperture requirements for the lens pair 16 and 17, and thus reduces aberration.

In a typical physical realization of the optically pumped laser of FIG. 8, the broad area laser diode 11 comprises a Model SLD 302V, commercially available from Sony, held fixed in a mount (not shown) which is temperature regulated. The SELFOC lens 12 is a Model SLW-1800-.22 pitch lens commercially available from NSG America of Somerset, N.J., and is glued onto a window of the laser diode package. The lens 12 need not be glued to the window, but could as well be mounted in some other way. The lens collects the diode output into a beam of low divergence. Any positive lens of large numerical aperture could work suitably well.

Light collected by the lens 12 travels for one-inch in free space and is then incident at a 45 degree angle of incidence in the horizontal dimension onto a spherically concave mirror 16, which has a radius of curvature of 10 mm. Mirror 16 is coated for high reflectivity at 45 degree for the 0.8 micron wavelength of the diode light. The reflected beam passes through 0.5 inches of space and is incident on a second identically curved mirror 17, also at a 45 degree angle of horizontal incidence. Positions of the mirrors have been adjusted so that after reflection from the second mirror, the beam has substantially less astigmatism and is substantially rounder than when it was emitted from the laser diode 11L. The horizontal rays are actually demagnified. The beam comes to a single, tight, round focus at a distance of 0.25 inches downstream from the second mirror 17. A member of laser gain material 14 placed at the beam focus absorbs the beam in the aforementioned desired mode volume, so a diode-pumped solid-state laser made around this piece of gain material 14 will exhibit the desirable properties of high efficiency and high gain.

Figure 9:
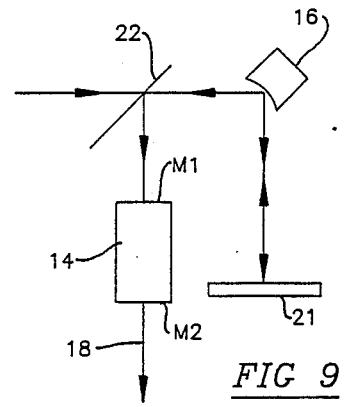
FIG. 9 is a schematic line diagram for an alternative embodiment to that portion of the structure of FIG. 8 delineated by line 9—9.

By using, in the horizontal plane, a 45 degree angle of incidence on the concave mirrors 16 and 17, and by using identical mirrors, the design is simplified. However, it is possible to achieve the goals of the present design with different combinations of different mirrors, with different angles of incidence and different separations between mirrors. Referring now to FIG. 9, there is shown an alternative embodiment of the present invention wherein plane mirror 21 is disposed after the first mirror 16 for reflecting the beam back for a second time onto the first concave mirror 16 and thence back along the path of the input beam to a beam splitter 22 which splits off the twice reflected beam into the laser gain medium 14. It is also possible to use lenses between the mirrors 16 and 17, or after both mirrors 16 and 17. The principal feature of the present invention is that it uses two concave mirrors 16 and 17, at non-normal incidence, to reshape the beam for optimal pumping of a solid-state laser gain material.

What is claimed is:

1. A method of shaping a beam of light rays emanated from a horizontally elongated source, to pump a laser gain medium, comprising the steps of:
reflecting said beam in a first reflection off a mirror having a horizontally concave surface at a non-normal angle in the plane of incidence, and reflecting said beam in a second reflection off a mirror having a horizontally concave surface at a non-normal angle in the plane of incidence, to de-magnify the horizontal dimension of the beam relative to its vertical dimension and thereby differentially focus rays in the horizontal and vertical planes to reduce the degree of elongation of the source image to improve laser pumping efficiency and gain at said laser gain medium.

2. The method of claim 1 wherein: said first reflection focuses vertically divergent rays of the beam towards a first vertical focal point beyond the second reflection and focuses horizontally divergent rays to a first horizontal focal point before the second reflection.

3. The method of claim 2 wherein: in said second reflection, vertically divergent once-focused rays are re-focused to a second vertical focal point having a depth of focus in said laser gain medium, and horizontally-divergent once-focused rays are refocussed to a second horizontal focal point having a depth of focus overlapping said vertical depth of focus in said laser gain medium.

4. The method of claim 1 including the step of:
using a lens having a power to gather rays emanated from said source and to focus gathered rays to a magnified source image which is then shaped through said first and second reflections onto the laser gain medium so that the lens power multiplies the magnification of the first and second reflections.

5. The method of claim 1 wherein said steps of reflecting said beam use two substantially identical spherical mirrors oriented with their axes in said horizontal plane at substantially identical 45 degree angles to the incident beam axis.

6. An imaging apparatus for shaping a beam of light rays emanated from a horizontally elongated source to pump a laser gain medium, comprising:
reflecting means for convergently reflecting said beam in first and second reflections at non-normal angles of incidence in its horizontal dimension, said means including two mirrors, at least one of which is horizontally convergent, to differentially focus said beam in its vertical and horizontal planes and thereby improve the shape of said beam for more efficient pumping.

7. The apparatus of claim 6 wherein: said first reflection focuses rays diverging in the vertical plane to a first vertical focal point beyond the point of axial incidence of the second reflection, and to focus rays diverging in the horizontal plane to a first horizontal focal point before the point of axial incidence of the second reflection.

8. The apparatus of claim 7 wherein: said second reflection focuses rays diverging in both said vertical and horizontal planes onto the laser gain medium.

9. The apparatus of claim 6 including:
lens means for gathering rays of optical pumping radiation emanating from said elongated source and for focusing gathered rays to a magnified source image for shaping by said reflecting means so that the power of said lens means multiplies the magnification of the reflecting means.

10. The apparatus of claim 6 wherein: said reflecting means comprises a pair of substantially spherically concave reflectors and wherein said non-normal angles of incidence are generally 45 degrees.

11. A laser comprising:
a semiconductor diode source of optical pumping radiation having an elongated output aperture;
a first horizontally concave mirror disposed to receive at a non-normal angle of horizontal incidence and to reflect optical pumping radiation emanated from said output aperture;
a second horizontally concave mirror disposed to receive at a non-normal angle of incidence said optical pumping radiation after reflection off said first concave mirror; and
a laser gain material disposed to receive optical pumping radiation as reflected from said second mirror, for being optically pumped.

12. The laser of claim 11 wherein said first and second concave mirrors are substantially spherical.

13. The laser of claim 12 wherein the horizontal angles of incidence for said first and second mirrors are both substantially 45 degrees.

14. The laser of claim 11 including a magnifying lens disposed in the path of said beam between said semiconductive diode source and said first concave mirror for magnifying the image of the output beam aperture.

* * * * *